United States Patent
Lee et al.

(10) Patent No.: US 12,019,451 B2
(45) Date of Patent: Jun. 25, 2024

(54) ELECTRIC CART

(71) Applicant: EVAR CO., LTD., Suwon-si (KR)

(72) Inventors: Hun Lee, Suwon-si (KR); Dong Hyuk Shin, Seongnam-si (KR); Ki Jae Kim, Seoul (KR)

(73) Assignee: EVAR CO., LTD., Suwon-si (KR)

( * ) Notice: Subject to any disclaimer, the term of this patent is extended or adjusted under 35 U.S.C. 154(b) by 849 days.

(21) Appl. No.: 16/951,237

(22) Filed: Nov. 18, 2020

(65) Prior Publication Data

US 2021/0072761 A1 Mar. 11, 2021

Related U.S. Application Data

(63) Continuation of application No. PCT/KR2020/001393, filed on Jan. 30, 2020.

(30) Foreign Application Priority Data

Feb. 1, 2019 (KR) .................. 10-2019-0013389
Feb. 1, 2019 (KR) .................. 10-2019-0013390
Apr. 5, 2019 (KR) .................. 10-2019-0040104

(51) Int. Cl.
G05D 1/00 (2024.01)
B60L 53/36 (2019.01)
B60Q 1/46 (2006.01)

(52) U.S. Cl.
CPC ............ *G05D 1/0225* (2013.01); *B60L 53/36* (2019.02); *B60Q 1/46* (2013.01); *G05D 1/0214* (2013.01)

(58) Field of Classification Search
CPC ......... Y02T 10/70; Y02T 90/14; Y02T 90/12; B60L 53/14; B60L 53/00; B64U 50/19; H02J 7/0044; H02J 2310/48
See application file for complete search history.

(56) References Cited

U.S. PATENT DOCUMENTS

| 5,163,189 | A | * | 11/1992 | DeGray | A61G 7/1034 |
| | | | | | 5/81.1 R |
| 6,157,162 | A | * | 12/2000 | Hayashi | H02J 7/0042 |
| | | | | | 320/104 |
| 7,999,506 | B1 | * | 8/2011 | Hollar | B60L 53/34 |
| | | | | | 320/109 |
| 9,056,555 | B1 | * | 6/2015 | Zhou | B60L 53/35 |
| 9,327,607 | B2 | * | 5/2016 | Oh | B60L 53/35 |

(Continued)

FOREIGN PATENT DOCUMENTS

| JP | 09-202235 A | 8/1997 |
| KR | 20-2012-0001845 A | 3/2012 |

(Continued)

OTHER PUBLICATIONS

EVAR "Electric Vehicle Automatic Recharging robot (2018 Samsung C-Lab Project)"; published in Youtube (https://www.youtube.com/watch?v=UInSXwYX3I8) on Sep. 10, 2018.

(Continued)

*Primary Examiner* — Steven B Theriault

(74) *Attorney, Agent, or Firm* — Studebaker & Brackett PC

(57) ABSTRACT

An electric cart is provided. The electric cart includes a body, an operating unit disposed in the body, an obstacle sensor to generate an obstacle stop signal by sensing an obstacle, a wheel provided to move the body, a motor to control a driving of the wheel, and an electronic control unit to control the motor.

18 Claims, 12 Drawing Sheets

(56) References Cited

U.S. PATENT DOCUMENTS

| | | | |
|---|---|---|---|
| 9,493,087 B2* | 11/2016 | Leary | B60L 53/65 |
| 9,498,886 B2* | 11/2016 | Rosenstein | B25J 13/084 |
| 9,552,056 B1* | 1/2017 | Barry | B25J 9/1689 |
| 9,592,742 B1* | 3/2017 | Sosinov | B60L 53/68 |
| 9,815,377 B2* | 11/2017 | Wu | B60L 53/65 |
| 9,868,421 B2* | 1/2018 | Hassounah | B60L 53/80 |
| 10,206,835 B2* | 2/2019 | Jurka | B60B 33/0092 |
| 10,207,592 B1* | 2/2019 | Warden | G05D 1/021 |
| 10,220,717 B2* | 3/2019 | Ricci | B60L 53/63 |
| 10,236,698 B2* | 3/2019 | Chen | H02J 7/0044 |
| 10,391,873 B2* | 8/2019 | Köhnke | B60L 53/80 |
| 10,404,084 B2* | 9/2019 | Wu | H02J 7/0042 |
| 10,507,733 B2* | 12/2019 | Blum | B60L 53/35 |
| 10,532,663 B2* | 1/2020 | Ricci | B60L 53/126 |
| 10,800,279 B2* | 10/2020 | Bhat | B60L 53/14 |
| 10,881,479 B2* | 1/2021 | Griffiths | G05D 1/0011 |
| 11,091,053 B2* | 8/2021 | Ma | B60L 53/11 |
| 11,158,084 B2* | 10/2021 | Ross | B25J 9/1692 |
| 11,220,190 B2* | 1/2022 | Schütz | B60L 53/31 |
| 11,285,838 B2* | 3/2022 | Vliet | B60L 53/57 |
| 11,358,484 B2* | 6/2022 | Lee | B60L 53/16 |
| 11,372,408 B1* | 6/2022 | Webster | G05D 1/0212 |
| 11,390,182 B2* | 7/2022 | Catarino | H02J 1/001 |
| 11,420,530 B2* | 8/2022 | Akhavan-Tafti | B60L 53/62 |
| 11,433,546 B1* | 9/2022 | Assaf | B25J 5/007 |
| 11,446,810 B1* | 9/2022 | Chua | B25J 19/023 |
| 11,511,635 B2* | 11/2022 | Sosinov | G05D 1/0276 |
| 11,535,290 B2* | 12/2022 | Sa | B62B 5/0073 |
| 11,541,769 B2* | 1/2023 | Kwak | G05B 19/042 |
| 2006/0028177 A1* | 2/2006 | Ferro | B62B 1/125 320/114 |
| 2010/0076600 A1* | 3/2010 | Cross | G05D 1/0022 700/264 |
| 2010/0225163 A1* | 9/2010 | Knepple | B64D 41/00 307/9.1 |
| 2011/0015842 A1* | 1/2011 | Kume | B62B 5/0026 701/67 |
| 2012/0130582 A1 | 5/2012 | Hukkeri | |
| 2012/0294696 A1* | 11/2012 | Summer | G05B 19/409 700/264 |
| 2012/0299531 A1* | 11/2012 | Prosser | B60L 53/18 320/132 |
| 2013/0076902 A1* | 3/2013 | Gao | B25J 9/042 348/148 |
| 2015/0137740 A1* | 5/2015 | Allos | H02J 7/342 320/107 |
| 2015/0281640 A1* | 10/2015 | Kwon | G06F 3/016 348/14.07 |
| 2016/0118828 A1* | 4/2016 | Berry | E21C 31/12 307/10.1 |
| 2016/0287465 A1* | 10/2016 | Rabin | B60L 3/0015 |
| 2017/0216115 A1* | 8/2017 | Parker | A61G 5/122 |
| 2017/0225336 A1* | 8/2017 | Deyle | B25J 5/007 |
| 2017/0355384 A1* | 12/2017 | Izz | H02K 7/1846 |
| 2018/0001777 A1* | 1/2018 | Kilic | B60L 53/68 |
| 2018/0053231 A1* | 2/2018 | Clark | G06K 7/10386 |
| 2018/0120830 A1* | 5/2018 | Wolter | B60H 1/00657 |
| 2018/0126858 A1* | 5/2018 | Blum | B60L 53/35 |
| 2018/0162433 A1* | 6/2018 | Jones | B62B 5/0036 |
| 2018/0253108 A1* | 9/2018 | Heinla | G06T 7/73 |
| 2019/0009756 A1* | 1/2019 | Jacobs | B60L 53/67 |
| 2019/0019407 A1* | 1/2019 | Nakhjavani | G06Q 20/10 |
| 2019/0092179 A1* | 3/2019 | Kwa | B25J 9/005 |
| 2019/0137991 A1* | 5/2019 | Agarwal | G01C 21/383 |
| 2019/0217737 A1* | 7/2019 | Lotfy | G06Q 10/02 |
| 2019/0220032 A1* | 7/2019 | Skorinko | G05D 1/0088 |
| 2019/0227154 A1* | 7/2019 | Viswanathan | A61G 5/10 |
| 2019/0275907 A1* | 9/2019 | Lee | G05D 1/0231 |
| 2019/0282433 A1* | 9/2019 | Higgins | A61H 3/06 |
| 2019/0351773 A1* | 11/2019 | Merritt | B60L 53/52 |
| 2020/0050206 A1* | 2/2020 | Deyle | G05D 1/0088 |
| 2020/0086753 A1* | 3/2020 | Hou | B60L 53/65 |
| 2020/0125191 A1* | 4/2020 | Cherney | G06F 3/0484 |
| 2020/0142397 A1* | 5/2020 | Kim | G05D 1/028 |
| 2020/0238848 A1* | 7/2020 | Vliet | B60L 53/305 |
| 2020/0361329 A1* | 11/2020 | Schütz | B60L 53/53 |
| 2020/0376974 A1* | 12/2020 | Freese, V | G05D 1/0238 |
| 2021/0101496 A1* | 4/2021 | Brendel | B60L 53/37 |
| 2022/0324329 A1* | 10/2022 | Hanson | B60K 37/06 |

FOREIGN PATENT DOCUMENTS

| | | |
|---|---|---|
| KR | 10-2013-0070976 A | 6/2013 |
| KR | 10-2033325 B1 | 10/2019 |
| KR | 10-2033326 B1 | 10/2019 |
| WO | 2017-030188 A1 | 2/2017 |

OTHER PUBLICATIONS

EVAR "Autonomous charging robot by Samsung"; published in Youtube (https://www.youtube.com/watch?v=5on--fx-mjw) on Sep. 11, 2018.

International Search Report issued in PCT/KR2020/001393; mailed May 13, 2020.

* cited by examiner

Docking moving direction

ELECTRIC CART

CROSS-REFERENCE TO RELATED APPLICATIONS

The present application is a continuation of International Patent Application No. PCT/KR2020/001393, filed on Jan. 30, 2020, which is based upon and claims the benefit of priority to Korean Patent Application Nos. 10-2019-0013389 filed on Feb. 1, 2019, 10-2019-0013390 filed on Feb. 1, 2019 and 10-2019-0040104 filed on Apr. 5, 2019. The disclosures of the above-listed applications are hereby incorporated by reference herein in their entirety.

BACKGROUND

Embodiments of the inventive concept described herein relate to an electric cart, and more particularly, relate to an electric cart for charging an electric vehicle, which can be automatically stopped, can provide an alert to an obstacle through rebound and stimulation, can drive based on user driving control and autonomous driving, and can ensure driving safety through central control and manager control.

Recently, studies and researches have been actively performed on a transportation to cope with various problems such as depletion of fossil fuels and environmental pollution.

In addition, a representative one of transportations which have been already commercialized is an electric vehicle, but charging the electric vehicle has been mentioned together whenever the electric vehicle introduced.

Installation of a charging device for the electric vehicle in all parking spaces of a parking lot in an apartment or a building actually requires a larger amount of costs, and is inefficient because a vehicle other than the electric vehicle is present.

Alternatively, the charging device for the electric vehicle may be installed only in some parking spaces. In this case, extra parking spaces may be present to degrade an efficiency, and charging devices may be insufficient when the a larger number of electric vehicles enter the parking lot.

An alternative for solving the problem is to share a charging cart for charging electricity. However, a conventional charging cart requires manpower of many users when moving.

Meanwhile, when an auxiliary electric cart is used depending on the driving control of the user, the labor of the user may be reduced. Further, if necessary, when the electric cart moves through autonomous driving to charge the electric vehicle and to return to an original place through the autonomous driving such that the electric cart is self-charged in a charging station, the manpower of the user may be hardly consumed.

However, a system for such an electric cart may cause an accident due to the insufficient driving skill and the carelessness of the user in the driving control by the user, and may cause an accident when system errors occur in the case of autonomous driving.

SUMMARY

Embodiments of the inventive concept provide an electric cart capable of automatically stopping, of preventing the collision with an obstacle, of reducing damages in collision, and of providing an alert to an obstacle to the user.

Embodiments of the inventive concept provide an electric cart for charging an electric vehicle, capable of reducing the labor force of a user by driving based on the driving control of the user and the autonomous driving and of ensuring driving safety through central control and manager control in an emergency situation.

The objects of the inventive concept are not limited to the above, but other objects, which are not mentioned, will be apparently understood to those skilled in the art.

According to an exemplary embodiment, a cart may include a body, an operating unit disposed in the body, an obstacle sensor to generate an obstacle stop signal by sensing an obstacle, a wheel provided to move the body, a motor to control a driving of the wheel, and an electronic control unit to control the motor. The operating unit may generate a user driving signal and a user stop signal by sensing at least one of an intensity and a direction of external force applied through contact with a user body, and the electronic control unit may drive and stop the cart by driving the motor in response to the user driving signal and the user stop signal, and may perform at least one of stopping the cart and controlling a moving direction by controlling the motor in preference to the user driving signal, when the obstacle stop signal is generated during driving of the cart.

According to an exemplary embodiment, a cart, which may drive through at least one of user control and autonomous driving to charge an electric vehicle parked in a parking lot, may be controlled to drive and stop through at least one of central control and manager control in preference to the user control and the autonomous driving.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
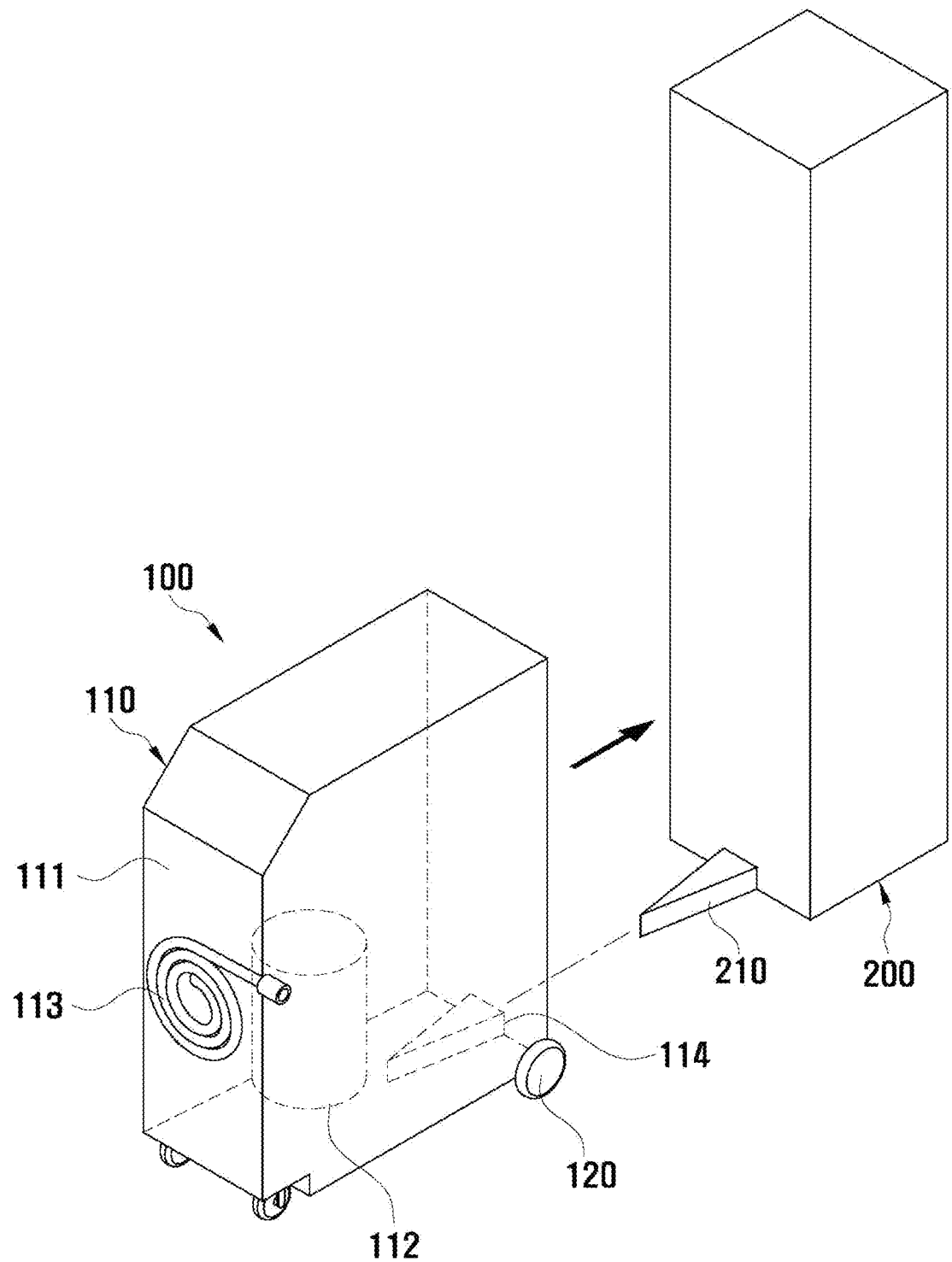
FIG. 1 is a perspective view illustrating a cart of the inventive concept.

Advantage points and features of the inventive concept and a method of accomplishing thereof will become apparent from the following description with reference to the following drawings, wherein embodiments will be described in detail with reference to the accompanying drawings. However, the inventive concept may be embodied in various different forms, and should not to be construed as being limited only to the illustrated embodiments. Rather, these embodiments are provided as examples so that the inventive concept will be thorough and complete, and will allow those skilled in the art to fully understand the scope of the inventive concept. The inventive concept may be defined by scope of the claims.

The terminology used herein is provided for explaining embodiments, but the inventive concept is not limited thereto. As used herein, the singular terms are intended to include the plural forms as well, unless the context clearly indicates otherwise. Furthermore, it will be further understood that the terms "comprises", "comprising," "includes" and/or "including", when used herein, specify the presence of stated components, but do not preclude the presence or addition of one or more other components. The same reference numerals will be assigned to the same component throughout the whole specification, and "and/or" refers to that components described include not only individual components, but at least one combination of the components. It will be understood that, although the terms "first", "second", etc., may be used herein to describe various components, these components should not to be limited by these terms. These terms are only used to distinguish one component from another component. Thus, a first component to be described below may be a second component without departing from the teachings of the inventive concept.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein to make it easier to describe the relationship between one component and another component. It will be understood that the spatially relative terms are intended to encompass different orientations of the device in use or operation in addition to the orientation depicted in the drawings. For example, when a device illustrated in accompanying drawings is reversed, a device provided 'below' or 'beneath' another device may be placed 'above' another device. Accordingly, the term "below" may include both concepts of "below" and "above". A device may be oriented in a different direction. Accordingly, terminology having relatively spatial concepts may be variously interpreted depending on orientations.

Figure 2:
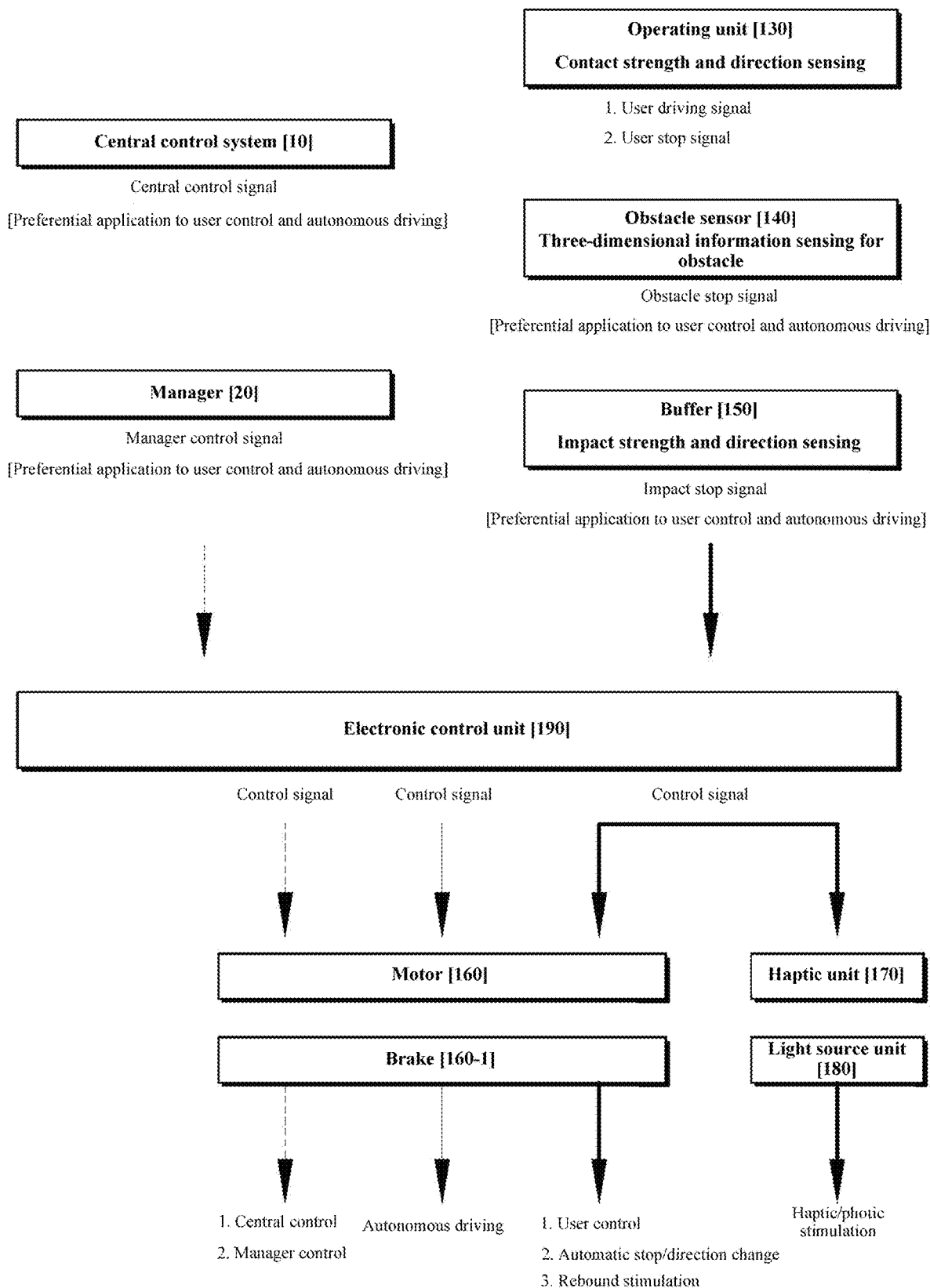
FIG. 2 is a schematic view illustrating that a cart of the inventive concept is controlled.
Figure 3:
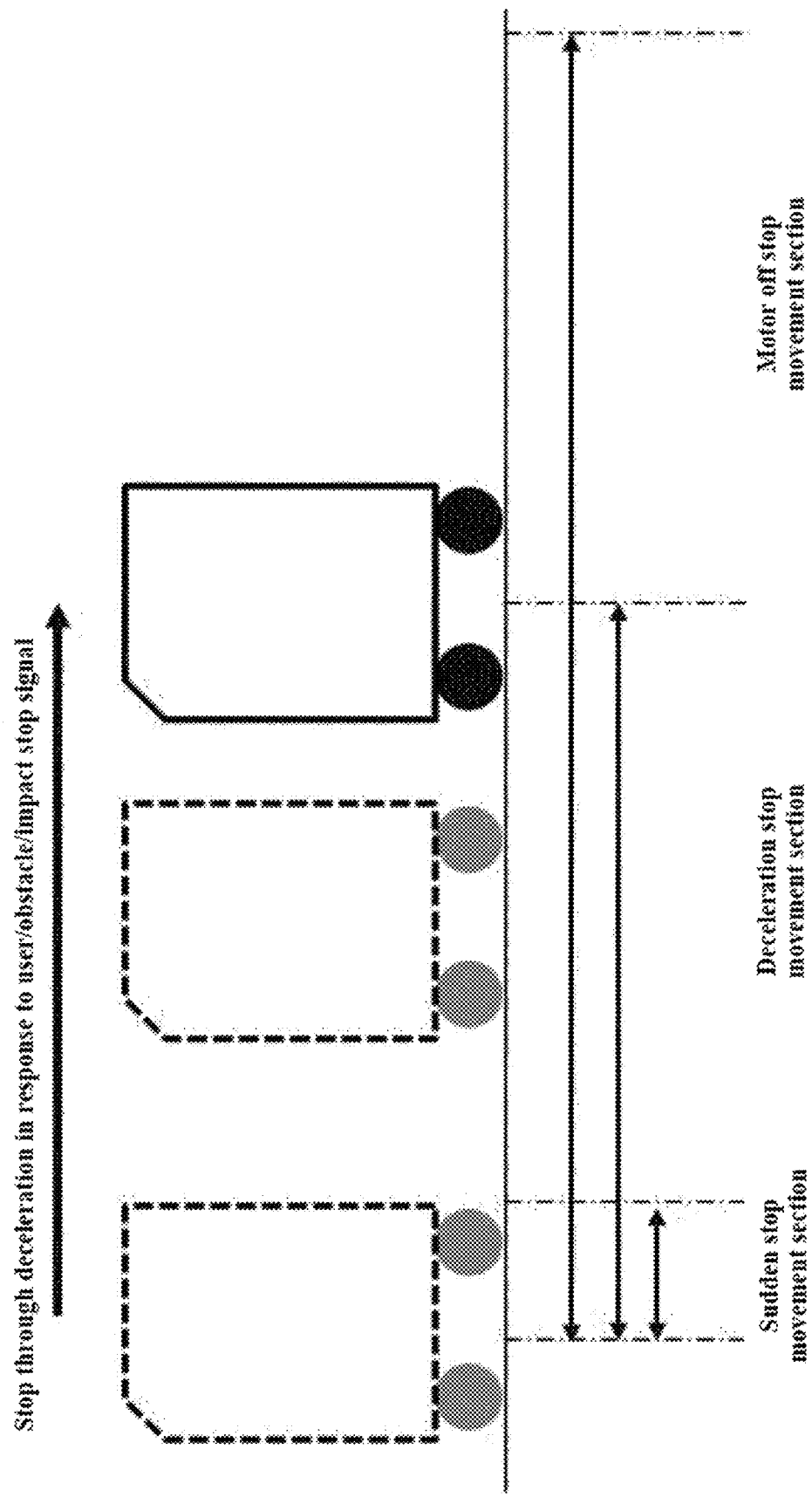
FIG. 3 is a schematic view illustrating that a cart of the inventive concept is stopped through deceleration.
Figure 4:
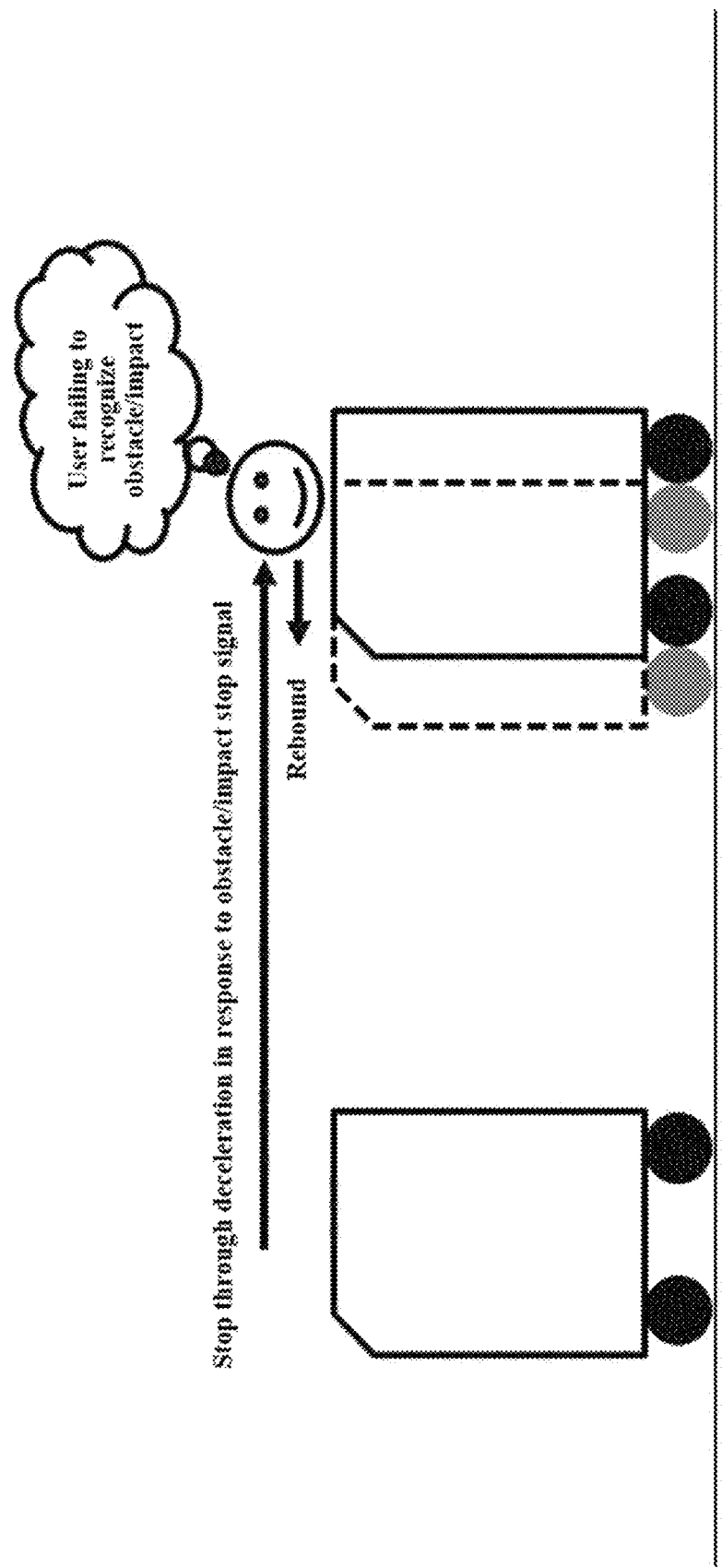
FIG. 4 is a schematic view illustrating a cart of the inventive concept reacts.

Hereinafter, a cart 100 of the inventive concept will be described with reference to accompanying drawings. FIG. 1 is a perspective view illustrating a cart of the inventive concept, FIG. 2 is a schematic view illustrating that a cart of the inventive concept is controlled, FIG. 3 is a schematic view illustrating that a cart of the inventive concept is stopped through deceleration, FIG. 4 is a schematic view illustrating a cart of the inventive concept reacts, and FIGS. 5A to 5F are schematic views illustrating that a cart of the inventive concept applies stimulation to a user.

The cart 100 of the inventive concept may be an electric cart supported and movable through electric motion to reduce the labor force of a user for moving the cart 100. The cart 100 of the inventive concept may drive through at least one of user control and autonomous driving (that is, the cart of the inventive concept is a concept including all a cart driving through the user control, a cart driving through the autonomous driving, and a cart driving through both the user driving and the autonomous driving). If necessary, as a central control system 10 and a manager 20 are involved, the cart 100 of the inventive concept may drive in response to a central control signal and a manager control signal in preference to user intent and autonomous driving.

Although the following description will be made in that the cart 100 of the inventive concept is a cart to charge the electric vehicle by way of example, the usage of the cart 100 of the inventive concept is not limited thereto. For example, the cart 100 of the inventive concept may be used for transferring an article.

The cart 100 of the inventive concept may include a body 110, a wheel 120, an operating unit 130, an obstacle sensor 140, a bumper 150, a motor 160, a brake 160-1, a haptic unit 170, a light source unit 180, and an electronic control unit (ECU) 190.

The body 110, which is a component constituting a main body of the cart 100, may include a case 111, an electric energy storage 112, a charging device 113, and a docking terminal 114.

The case 111 may be a member constituting an outer appearance. The electric energy storage 112 may be a member, which receives electric energy from a charging station 200 and supplies the electric energy to the electric vehicle. The electric energy storage 112 may be provided in various types. For example, the electric energy storage 112 may be a secondary cell. The charging device 113 may be electrically connected with the electric energy storage 112, and may be provided at an end portion thereof with a docking connector docked on a charging member of the electric vehicle (a charging device to charge the electric vehicle). The electric energy of the electric energy storage 112 may be supplied to the electric vehicle through the charging device 113. Accordingly, a user may charge the electric vehicle using the cart 100 of the inventive concept. The docking terminal 114 may be electrically connected with the electric energy storage 112 and may be docked on a charging terminal 210 of the charging station 200 (self-charging terminal). Accordingly, the user may charge the cart 100 of the inventive concept.

The wheel 120 may be provided at a lower portion of the body 110 for the movement of the body 110. The wheel 120 may receive driving force from the motor 160 to drive. In other words, the wheel 120 may drive depending on the revolution per minute (RPM) and the torque (rotational force) of the motor 160.

The cart 100 of the inventive concept may have four wheels 120, two of the four wheels 120, which serve as front wheels, may be driven on fixed driving shafts by the motor 160, and driving shafts of remaining two of the four wheels 120, which serve as rear wheels, may be changed depending on a moving direction through the connector. In other words, the front wheels, which have no degree of freedom, are driven by the motor 160 to move the cart 100. The rear wheels having the degree of freedom may be driven through the driving of the front wheels, and the postures of the rear wheels may be varied through the connector such that the driving shafts of the rear wheels may be changed perpendicularly to the moving direction.

However, the structure and the function of the cart 100 of the inventive concept are not limited thereto, and the cart 100 of the inventive concept may have various structures and functions depending on a mechanical design request.

The operating unit 130 may be a member disposed on an upper end of the body 110 to make contact with a body of the user. For example, the operating unit 130 may be provided in the form of a handle, and the user may control the moving speed and the moving direction of the cart 100 by controlling the intensity and the direction of force applied to the operating unit 130 while griping the operating unit 130. The inventive concept is not limited thereto.

To this end, the operating unit 130 is embedded therein with a sensor to sense at least one of the intensity and the direction of external force applied through the contact with a user body. For example, the operating unit 130 may be equipped therein with a contact sensor (load cell), but the inventive concept is not limited thereto. Various sensors may be used as the sensor of the operating unit 130 of the inventive concept.

After sensing at least one of the intensity and the direction of external force applied through the contact with the user body, the operating unit 130 may generate a user driving signal and a user stop signal corresponding to the at least one of the intensity and the direction of the external force.

For example, when the user uniformly forward applies force to the operating unit 130 with both hands, a driving signal may be generated for forward-driving at a specific speed. In this case, the two front wheels of the wheels 120 may drive with the same torque at the same RPM, and the RPM and the torque may be determined depending on force applied by the user (moving speed may be determined).

Alternatively, when the user may apply force forward to be biased to the left hand of both hands, a driving signal may be generated for right-turning at a specific speed. In this case, the left wheel of two front wheels of the wheel 120 may have an RPM and torque higher than an RPM and torque of the right wheel, and the RPM and the torque may be determined depending on force applied by the user (moving speed may be determined).

Further, the user may generate a stop signal by taking both hands off the operating unit 130.

The obstacle sensor 140 may generate information on an obstacle and an obstacle stop signal by sensing the obstacle. The information on the obstacle may include various types of information, for example, three-dimensional information, but the inventive concept is not limited thereto.

The three-dimensional information on the obstacle may be depth information on the distance between the cart 100 and the obstacle, and the shape or the size of the obstacle, but the inventive concept is not limited thereto. Further, the obstacle sensor 140 may generate the three-dimensional information in time-series.

The obstacle sensor 140 may include various types of sensors. For example, a Lidar sensor, an ultrasonic sensor, a 3D camera module, an RGBD camera module, and a Kinect may be used as the obstacle sensor 140, but the inventive concept is not limited thereto.

The bumper 150 may be disposed at a lower portion of the body 110, and may be disposed along at least a portion of a circumference of the body 110. The bumper 150 may perform a buffering operation upon impact with the obstacle (air bumper). For example, the bumper 150 may be supported by an elastic member and may be recovered after moving in a direction opposite to a direction of the impact, thereby changing impact energy into elastic energy, such that the impact is canceled.

The bumper 150 may be embedded therein with a sensor to generate an impact stop signal by sensing at least one of the intensity and the direction of external force applied through impact. The sensor of the bumper 150 may include various types of sensors, and may include, for example, a contact sensor (load cell), but the inventive concept is not limited thereto.

The motor 160 may drive the wheel 120. In other words, the motor 160 may apply driving force to the wheel 120. In this case, the RPM and the torque of the motor 160 may be controlled by the electronic control unit 190. Various types of motors may be used for the motor 160. For example, the motor 160 may be an in-wheel motor, but the inventive concept is not limited thereto.

The brake 160-1 may stop the driving of the wheel 120 through physical friction, and the operation of the brake 160-1 may be controlled by the electronic control unit 190. Meanwhile, the brake 160-1 may be independently provided for each of a plurality of wheels 120 to individually control each of the wheels 120, thereby changing the moving direction of the cart 100 or stopping the cart 100. For example, brake force is applied to be biased to one of the two front wheels, thereby controlling the cart 100 to be curved in one direction due to the difference in the RPM and the torque of the two front wheels when the cart is stopped.

The haptic unit 170 may be disposed in the operating unit 130, and may provide haptic stimulation to the user, when at least one of the obstacle stop signal and the impact stop signal is generated during the driving of the cart 100.

Meanwhile, at least one of the intensity of the haptic stimulation provided from the haptic unit 170 and a position at which the haptic stimulation is provided may be determined depending on the information on the obstacle in the case of the haptic stimulation resulting from the obstacle stop signal, and may be determined depending on at least one of the intensity and the direction of external force applied through the impact in the case of the haptic stimulation resulting from the impact stop signal.

The light source unit 180 may be disposed in the body 110 or the operating unit 130, and may provide light stimulation to a user by outputting light when at least one of the obstacle stop signal and the impact stop signal is generated during the driving of the cart 100, which is similar to the haptic unit 170.

Meanwhile, at least one of the intensity of the light stimulation provided from the light source unit 180, the position at which the light is emitted, the range that the light is emitted, a wavelength band of the light, and the blinking pattern of the light may be determined depending on the information on the obstacle in the case of the light stimulation resulting from the obstacle stop signal and may be determined depending on at least one of the intensity and the direction of external force applied through the impact in the case of the light stimulation resulting from the impact stop signal.

The ECU 190 may electronically control components of the cart 100.

The ECU 190 may be electrically connected with the operating unit 130 to receive the user driving signal and the user stop signal, may be electrically connected with the obstacle sensor 140 to receive the obstacle stop signal, and may electrically connected with the bumper 150 to receive the impact stop signal.

The ECU 190 may control the motor 160, the brake 160-1, the haptic unit 170, and the light source unit 180 in response to the user driving signal, the user stop signal, the obstacle stop signal, and the impact stop signal.

The following description of the cart 100 of the inventive concept will be made regarding "user control". The ECU 190 may drive and stop the cart 100 by driving the motor 160 depending on the user driving signal and the user stop signal.

The following description of the cart 100 of the inventive concept will be made regarding "automatic stop". The cart 100 of the inventive concept may be stopped through the user intent in response to the user stop signal generated from the operating unit 130, and may be automatically stopped regardless of the user intent, in response to the obstacle stop signal generated from the obstacle sensor 140 and the impact stop signal generated from the bumper 150. In other words, the cart 100 of the inventive concept may be automatically stopped even though the user fails to recognize the obstacle or the impact, thereby preventing an accident or damage caused by the accident from being enlarged.

The ECU 190 may control at least one of the motor 160 and the brake 160-1 for the automatic stop in preference to the user driving signal, when the obstacle stop signal and/or the impact stop signal is generated during the driving of the cart 100, thereby stopping the cart 100.

In other words, the cart 100 of the inventive concept may ignore the user driving signal and automatically stop the cart 100 even though the user fails to recognize the obstacle or the impact, thereby preventing the impact accident or reducing the damage caused by the accident.

Further, the cart 100 of the inventive concept may control the moving direction of the cart 100 together with or separately from "automatic stop". In other words, the cart 100 of the inventive concept may perform at least one of stopping the cart 100 and controlling the moving direction of the cart 100, when the obstacle stop signal and/or the impact stop signal is generated.

For example, the ECU 190 may control at least one of the motor 160 and the brake 160-1 in preference to the user driving signal, when the obstacle stop signal and/or the impact stop signal is generated during the driving of the cart 100, thereby changing the moving direction of the cart 100. Accordingly, the cart 100 of the inventive concept may drive while automatically avoiding the obstacle, even if the user fails to recognize the obstacle.

Alternatively, the ECU 190 may control at least one of the motor 160 and the brake 160-1 in preference to the user driving signal, when the obstacle stop signal and/or the impact stop signal is generated during the driving of the cart 100, thereby changing the moving direction of the cart 100 and stopping the cart 100. Accordingly, the cart 100 of the inventive concept may stop while automatically avoiding the obstacle, even if the user fails to recognize the obstacle.

Meanwhile, the moving direction of the cart 100 in response to the obstacle stop signal and/or the impact stop signal may be determined depending on the information on the obstacle and/or the intensity and the direction of external force applied through the impact.

Meanwhile, the ECU 190 may apply torque to the motor 160 in a reverse direction when the user stop signal, the obstacle stop signal, and/or the impact stop signal is generated during the driving of the cart 100. Accordingly, the cart 100 may be stopped as the moving speed of the cart 100 is reduced. In this case, the reverse direction may refer to the direction opposite to the driving direction of the motor 160 during the driving.

In other words, the ECU 190 may drive the motor 160 in a forward direction in response to the user driving signal during the driving of the cart 100.

When the stop signal is generated during the driving of the cart 100, the cart 100 may be stopped after keeping driving in the driving direction by inertia (see "motor off stop movement section" of FIG. 3) by merely turning off the motor 160 by the ECU 190.

Alternatively, when the stop signal is generated during the driving of the cart 100, the cart 100 may suddenly stop and an impact may be applied to the user through rebound (see "sudden stop movement section" of FIG. 3), by merely turning off the motor 160 by the ECU 190 and forcibly stopping the driving of the wheel 120 using an additional brake pad component.

According to the inventive concept, to solve the above-described problems, when the stop signal is generated during the driving of the cart 100, the ECU 190 applies torque to the motor 160 in a direction reverse to the driving direction in driving (reversely change the direction of electromagnetic force of the motor), thereby canceling the torque in the forward direction by the inertia from the torque in the reverse direction by the electronic control.

Accordingly, the speed of the cart 100 is gradually reduced in the driving direction, and stops after driving to a specific distance, thereby reducing impact applied to the user through rebound, while moving in a shorter section.

The following description of the cart 100 of the inventive concept will be made regarding "rebound stimulation". Meanwhile, even when the obstacle stop signal and/or the impact stop signal is generated, the user continuously attempts to control driving without recognizing the presence of the obstacle and/or impact.

In this case, the cart 100 of the inventive concept may allow the user to recognize the presence of the obstacle and/or the presence of impact through the "rebound stimulation" (provide an alert).

To this end, the ECU 190 may control the motor 160 to move the cart 100 such that the rebound stimulation is provided to the user, when the user driving signal is generated within a specific time after at least one of the obstacle stop signal and the impact stop signal is generated during the driving of the cart 100.

When the cart 100 of the inventive concept is stopped through deceleration due to the obstacle or the impact, and the user driving signal is generated within a specific time in the state that the user fails to recognize the stop, the cart 100 may drive to cause an accident in the situation that the obstacle or the impact is not removed.

To prevent the problem, the cart 100 of the inventive concept may allow the user to recognize that the obstacle is present and the impact occurs, and that less than the specific time is elapsed from the situation that the obstacle is present and the impact occurs, through the rebound allowing the cart 100 to move to a specific distance in a direction opposite to the driving direction.

In this case, the specific time may be determined depending on the usage of the cart 100, the information on the obstacle, and the intensity of the impact, and may be determined depending on the proficiency of the user for the cart 100. In addition, the specific time may be set to a specific value or a parameter value before driving the cart 100.

In addition, the ECU 190 may control the motor 160 to move the cart 100 such that the rebound stimulation is provided to the user, when the user driving signal is generated in the state that at least one of the obstacle stop signal and the impact stop signal is maintained after at least one of the obstacle stop signal and the impact stop signal is generated during the driving of the cart 100.

In other words, when the cart 100 of the inventive concept may stop through deceleration due to the obstacle or the impact, the obstacle and the impact are maintained, and the user fails to recognize the obstacle and the impact to generate the user driving signal, the cart 100 may drive to cause an accident under the situation that the obstacle is not removed or the impact is maintained.

To prevent the above problem, the cart 100 of the inventive concept may allow the user to recognize the situation that the obstacle is present and/or the situation that the impact occurs, through the rebound allowing the cart 100 to move to a specific distance in a direction opposite to the driving direction.

The following description of the cart 100 of the inventive concept will be made regarding "alert stimulation provided". The ECU 190 may provide the haptic stimulation and/or light stimulation to the user using the haptic unit 170 and/the light source unit 180, when the obstacle stop signal and/or the impact stop signal is generated during the driving of the cart 100.

In other words, the cart 100 of the inventive concept notifies the user of that the cart 100 is stopped through deceleration in response to the obstacle stop signal and/or the impact stop signal, thereby allowing the user to expect the cart 100 to be stopped while recognizing a present situation.

In this case, the ECU 190 may determine at least one of the intensity of the haptic stimulation and a position at which the haptic stimulation is provided, depending on three-dimensional information on the obstacle and/or at least one of the intensity and the direction of the external force applied through the impact.

Figure 5A:
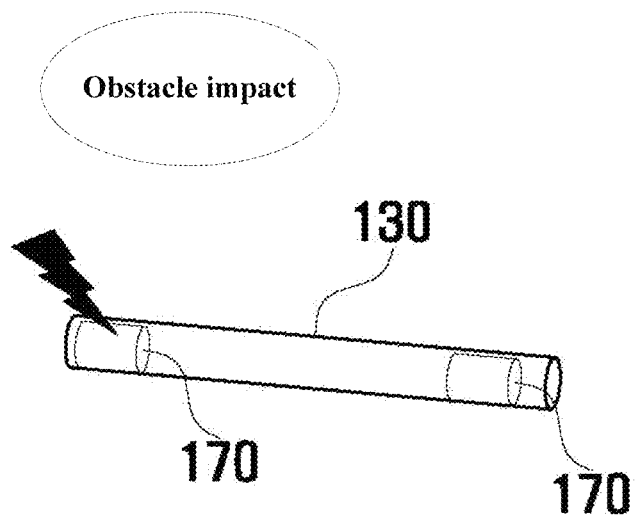
FIGS. 5A to 5F are schematic views illustrating that a cart of the inventive concept applies stimulation to a user.
Figure 5B:
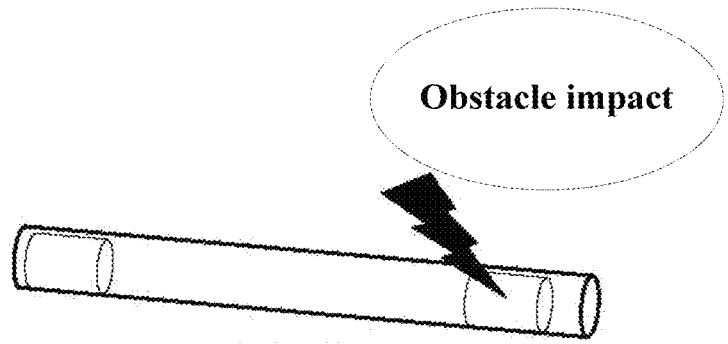
Figure 5C:
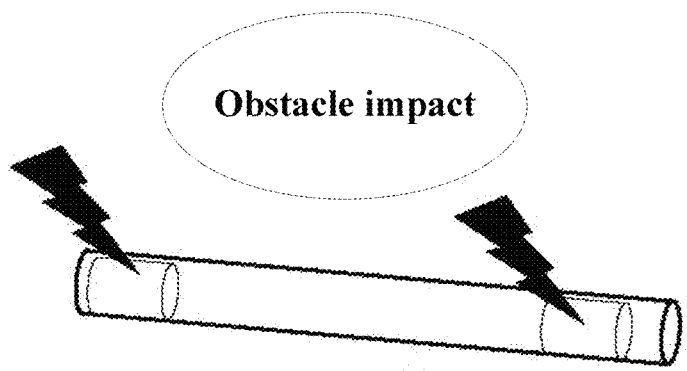

For example, when the obstacle is positioned at a left side or the impact occurs at the left side, the haptic stimulation may be applied to the left hand of the user (see FIG. 5A). Alternatively, when the obstacle is positioned at a right side or the impact occurs at the right side, the haptic stimulation may be applied to the right side of the user (see FIG. 5B). Alternatively, when the obstacle is positioned at the center or the impact occurs at the center, the haptic stimulation may be applied to both the left hand and the right hand of the user (see FIG. 5C). The intensity of the haptic stimulation may be increased depending on the intensity of the obstacle or the intensity of the impact.

In addition, the ECU 190 may determine at least one of the intensity of the light stimulation, the position at which the light is emitted, the range that the light is emitted, the wavelength band of the light, and the blinking pattern of the light, depending on at least one of the 3D information on the obstacle and/or the intensity and the direction of external force applied through the impact.

Figure 5D:
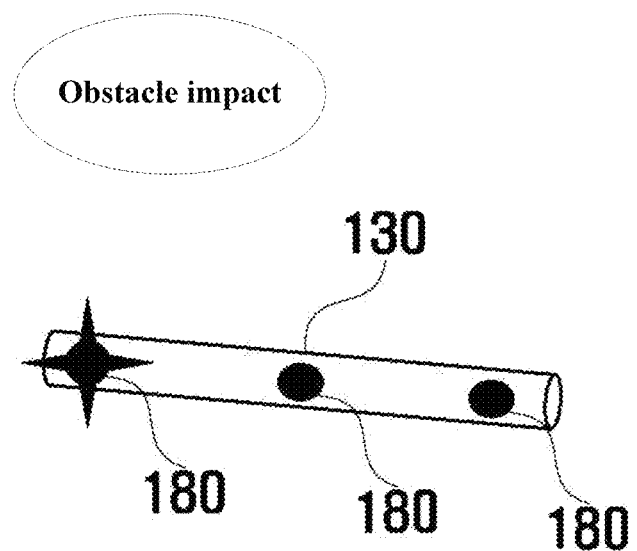
Figure 5E:
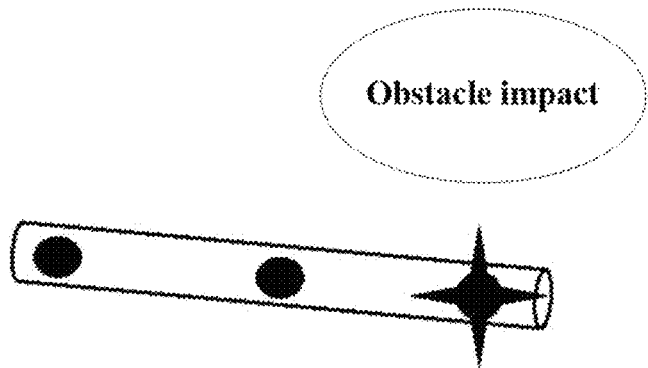
Figure 5F:
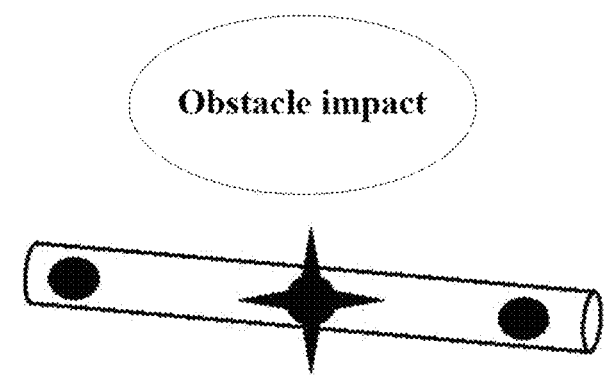

For example, when the obstacle is positioned at the left side or the impact occurs at the left side, the light source positioned at the left side may be blinked in a specific period (see FIG. 5D). Alternatively, when the obstacle is positioned at the right side or the impact occurs at the right side, the light source positioned at the right side may be blinked in a specific period (see FIG. 5E). Alternatively, when the obstacle is positioned at the center or the impact occurs at the center, the light source positioned at the center may be blinked in a specific period (see FIG. 5F). Further, the period that the light source is blinked may be reduced, the wavelength band of the emitted light may be changed, or the intensity (the degree of brightness) of the light stimulation may be increased depending on the size of the obstacle or the intensity of the impact.

Further, similarly to the "rebound stimulation", the ECU 190 may provide the haptic stimulation and/or the light stimulation using the haptic unit 170 and/or the light source unit 180 when the user driving signal is generated within a specific time after at least one of the obstacle stop signal and the impact stop signal is generated during the driving of the cart 100, and when the user driving signal is generated in the state that at least one of the obstacle stop signal and the impact stop signal is maintained after at least one of the obstacle stop signal and the impact stop signal is generated.

In this case, the ECU 190 may determine at least one of the intensity of the haptic stimulation and the position at which the haptic stimulation is provided, depending on at least one of the three-dimensional information and/or the intensity and the direction of external force applied through the impact.

Even though the user is alerted to that the cart 100 will be soon stopped by the obstacle or the impact, when the user fails to recognize the alert, the ECU 190 may provide the alert again.

Meanwhile, the haptic stimulation and/or the light stimulation may be differently provided in the obstacle stop signal and the impact stop signal. This is to allow the user to recognize whether the stop is made by the obstacle or the impact.

Figure 6:
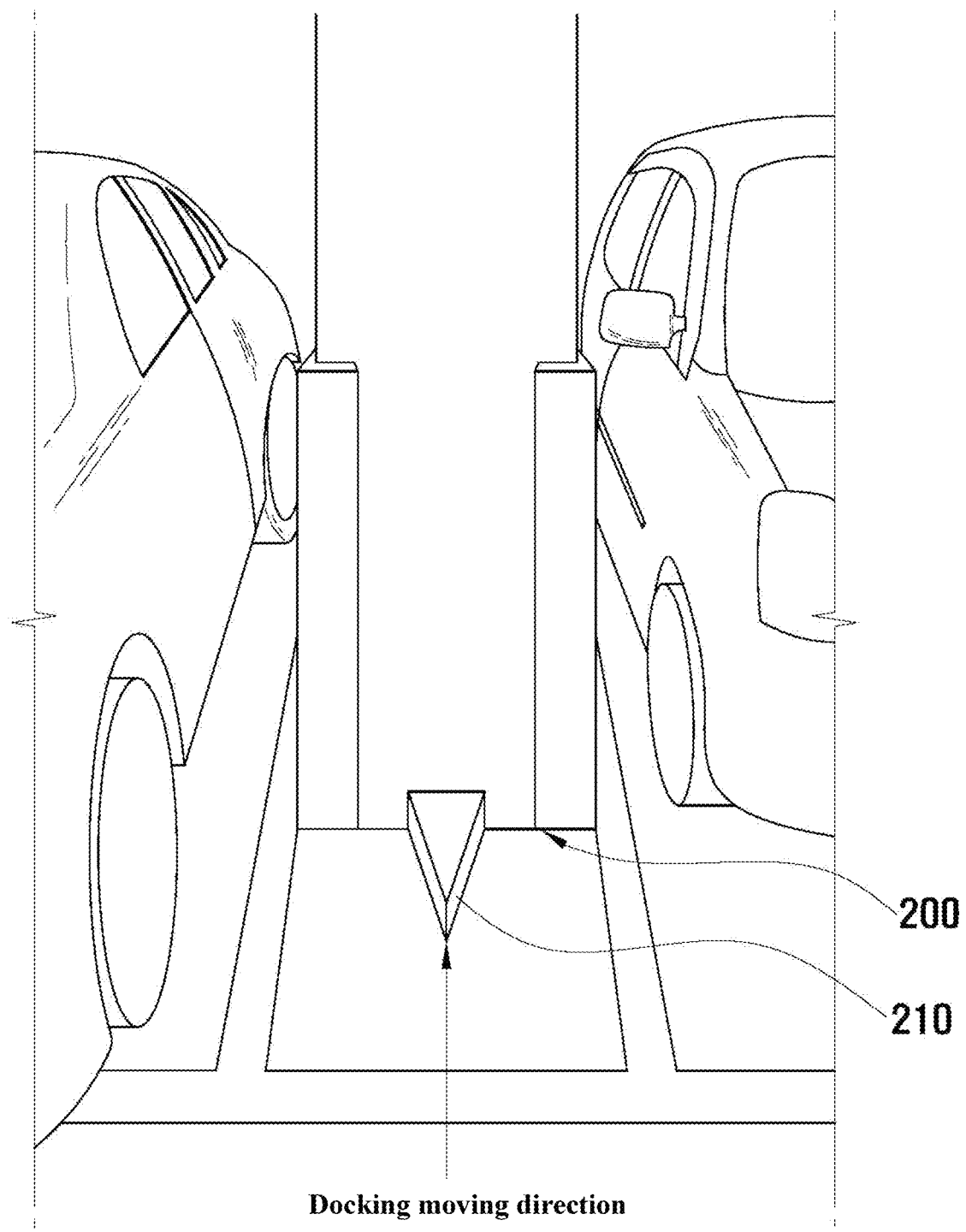
FIG. 6 is a perspective view illustrating a charging station to charge a cart of the inventive concept.
Figure 7A:
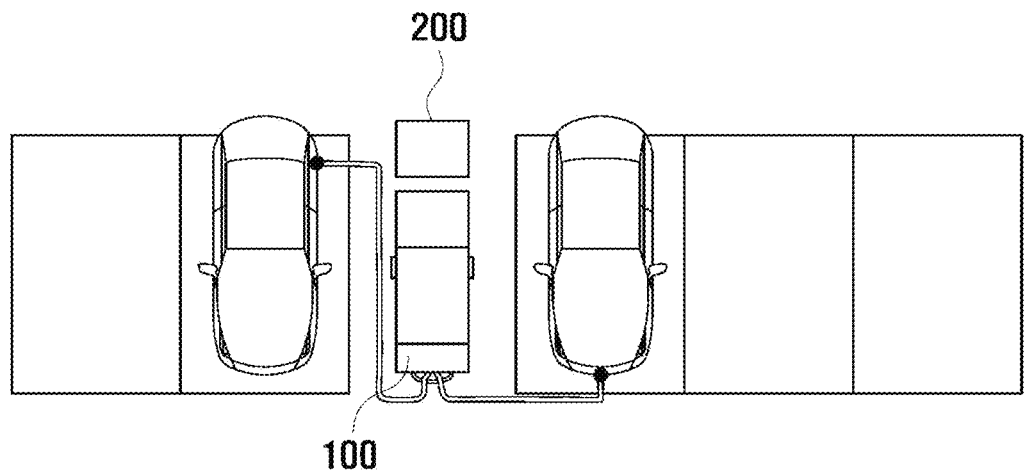
FIGS. 7A and 7B are schematic views illustrating the case that an electric vehicle is able to be charged without moving a cart of the inventive concept and the case that an electric vehicle is not able to be charged when the cart of the inventive concept is not moved.
Figure 7B:
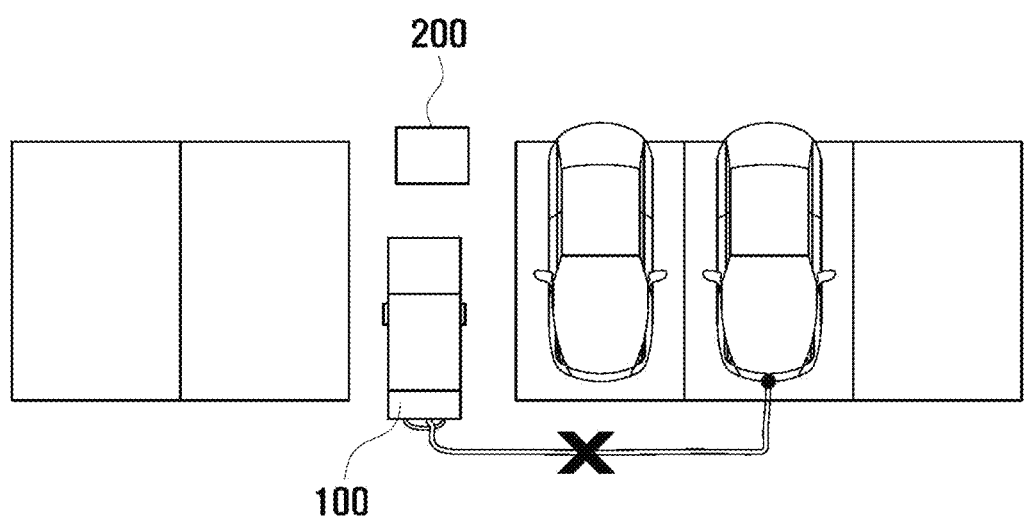
Figure 8:
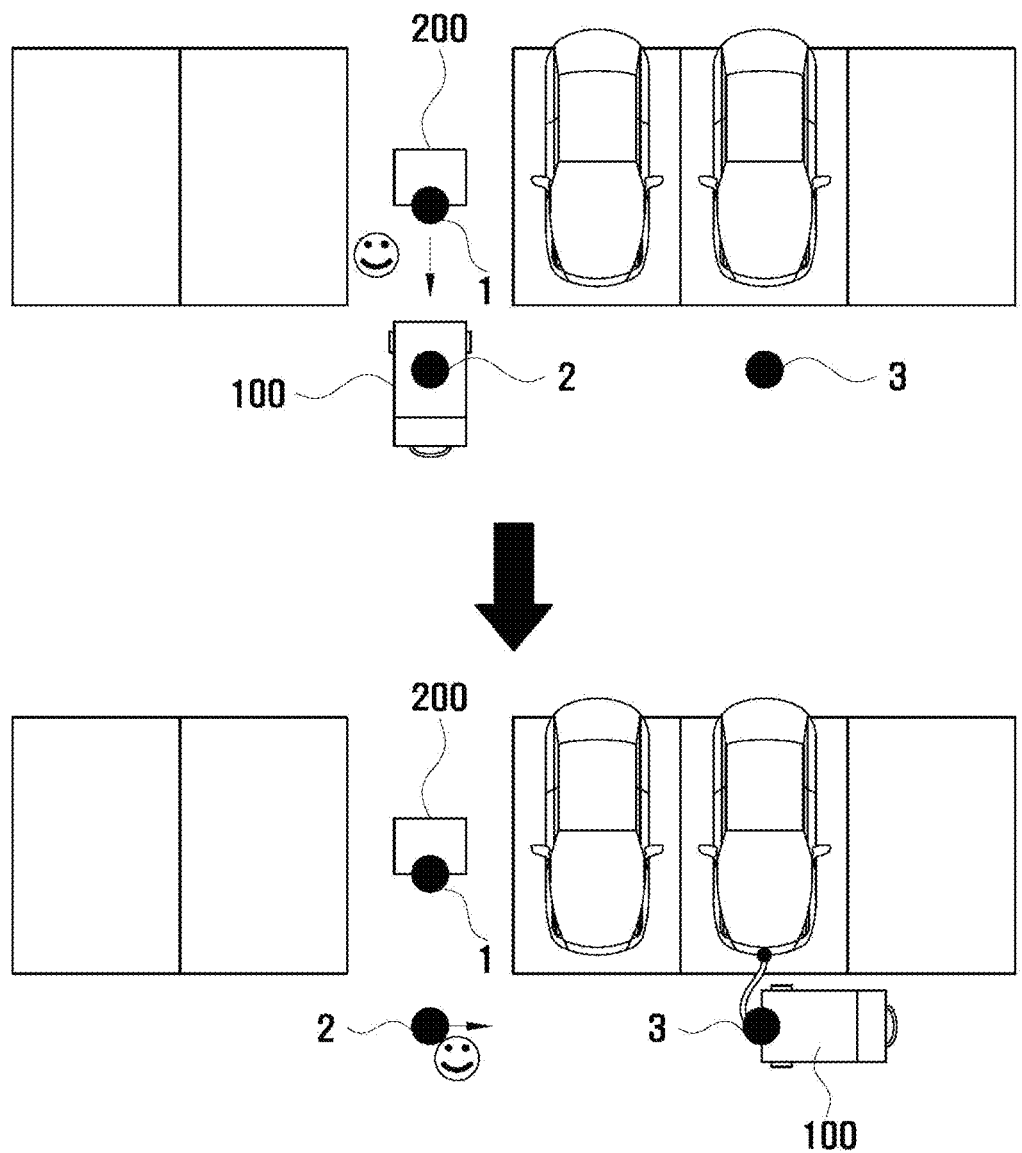
FIG. 8 is a schematic view illustrating a moving path of a cart of the inventive concept.
Figure 9:
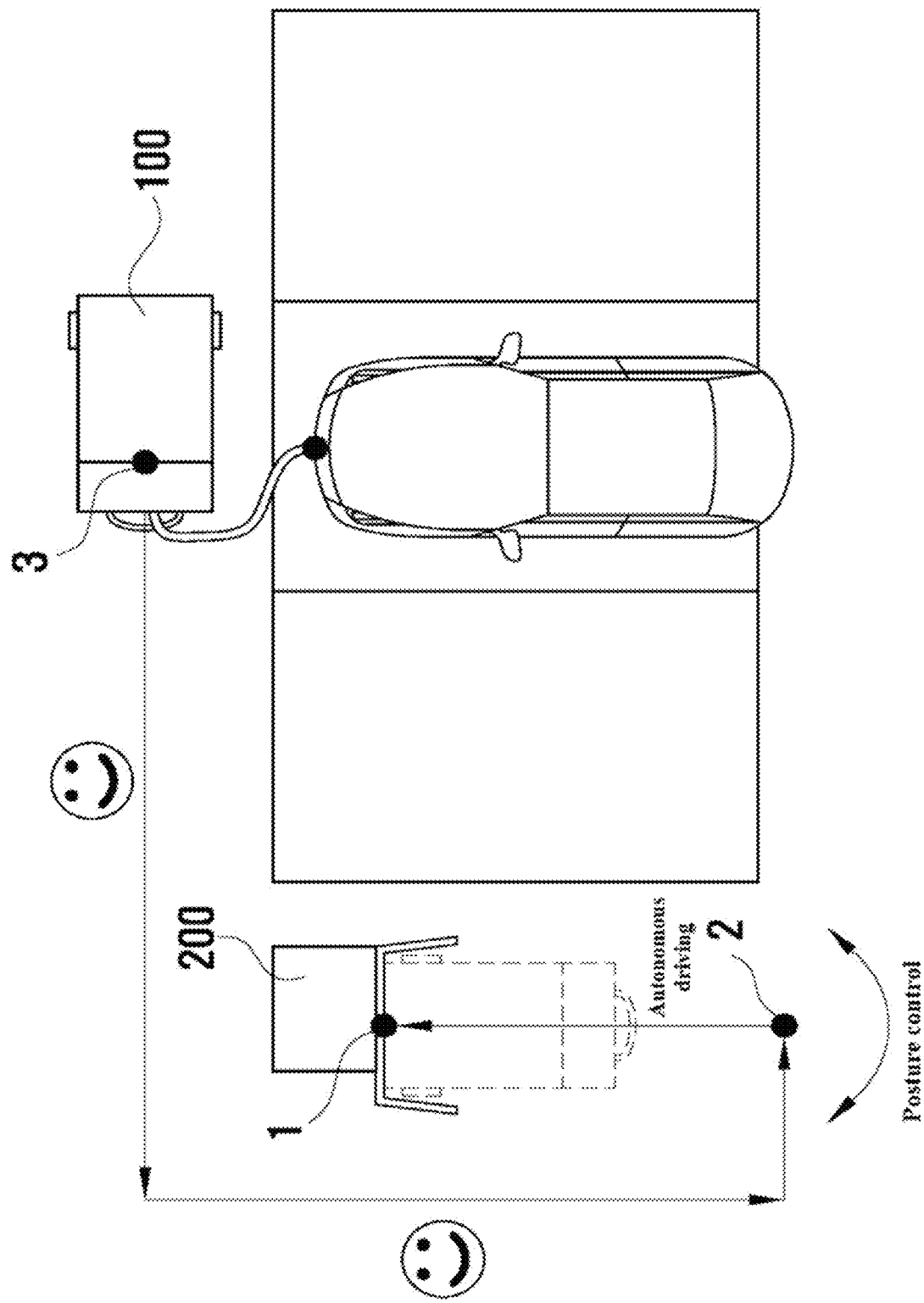
FIG. 9 is a schematic view that a cart of the inventive concept is docked on a charging terminal by autonomous driving from a point near a charging station to a charging terminal point.
Figure 10:
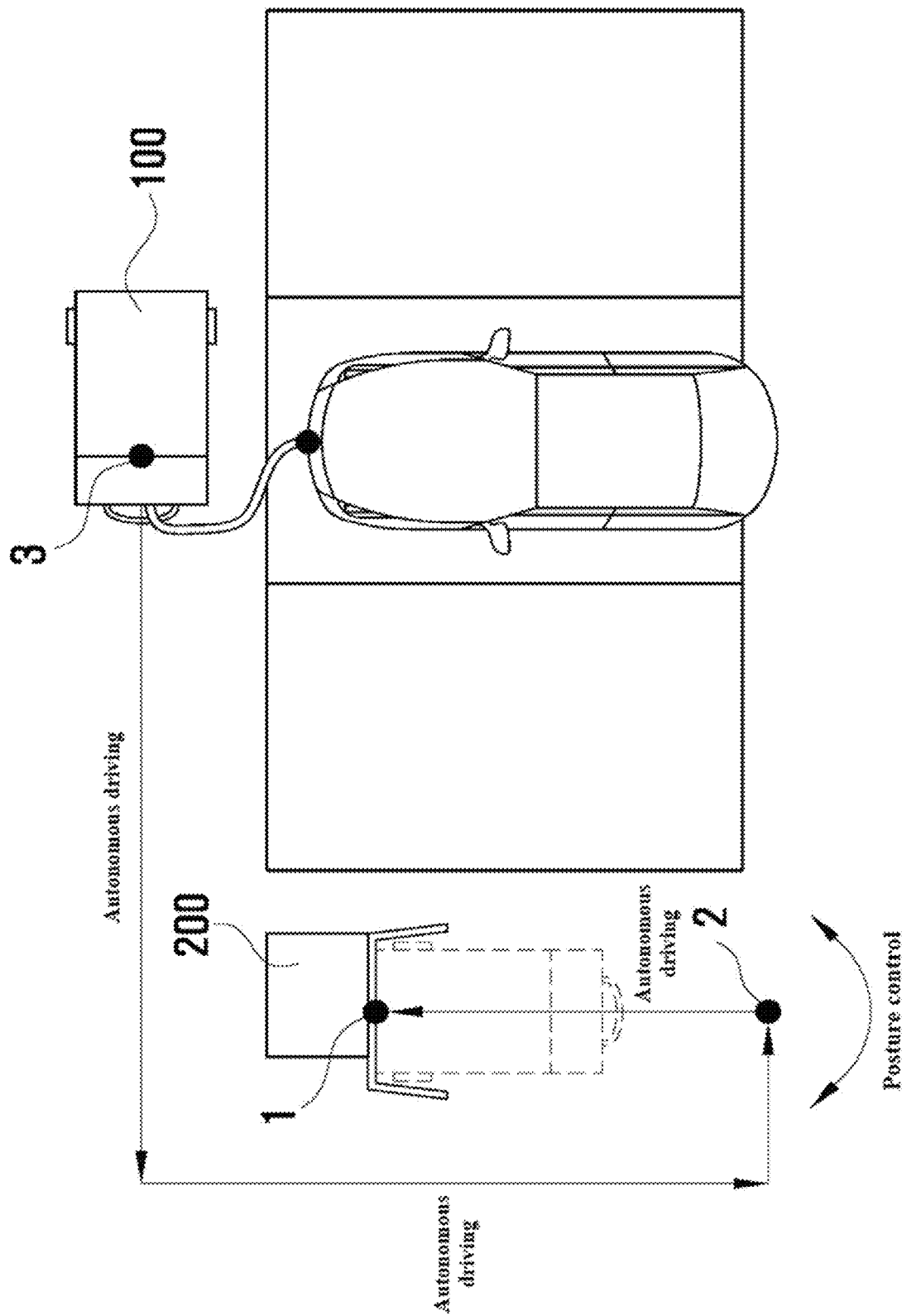
FIG. 10 is a schematic view that a cart of the inventive concept is docked on a charging terminal by autonomous driving from a point for charging an electric vehicle to a charging terminal point.
Figure 11:
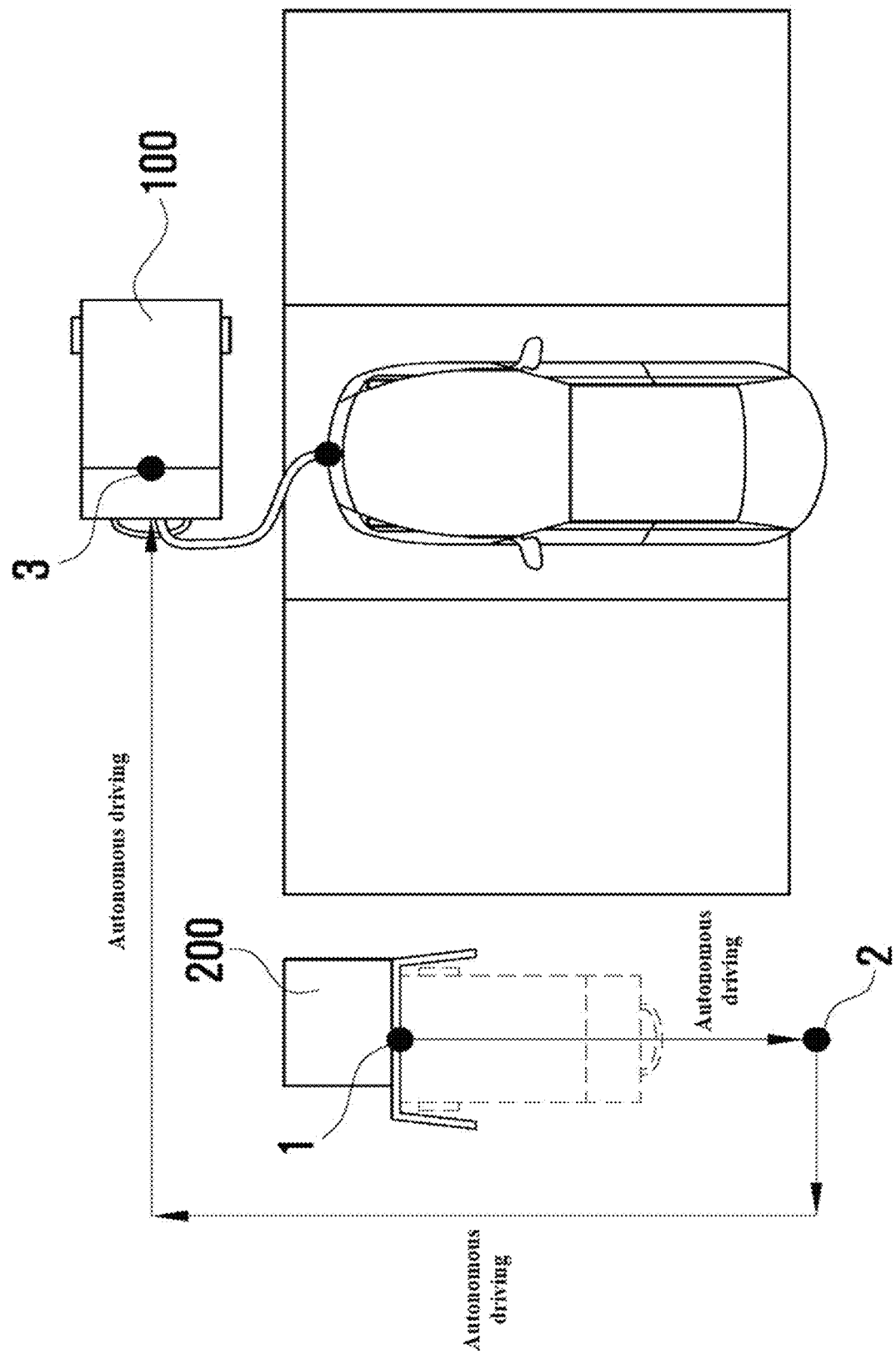
FIG. 11 is a schematic view that a cart of the inventive concept moves by autonomous driving from a charging terminal point to a point for charging an electric vehicle.

The following description will be made regarding that the cart 100 of the inventive concept performs autonomous driving, with reference to drawings. FIG. 6 is a perspective view illustrating a charging station to charge a cart of the inventive concept. FIGS. 7A and 7B are schematic views illustrating the case that an electric vehicle is able to be charged without moving a cart of the inventive concept and the case that an electric vehicle is not able to be charged when the cart of the inventive concept is not moved, FIG. 8 is a schematic view illustrating a moving path of a cart of the inventive concept, FIG. 9 is a schematic view that a cart of the inventive concept is docked on a charging terminal by autonomous driving from a point near a charging station to a charging terminal point, and FIG. 10 is a schematic view that a cart of the inventive concept is docked on a charging terminal by autonomous driving from a point for charging an electric vehicle to a charging terminal point.

The cart 100 of the inventive concept may be an electric cart to charge an electric vehicle parked in a parking lot. The cart 100 of the inventive concept is normally docked in the charging station and self-charged. Meanwhile, the charging station 200 may be preferably provided on a column between vehicle parking zones. In this case, all electric vehicles parked in both parking zones may be charged without moving one cart 100 (see FIG. 7A).

However, even if the charging station 200 is provided on the column between the vehicle parking zones, the column is not present in every parking zone. Accordingly, the cart 100 may be moved (see FIG. 7B).

In this case, the user may substantially linearly move the cart 100 from the charging terminal point 1 to a point 2 near the charging station to charge the electric vehicle, may change the posture of the cart 100, and may substantially linearly move the cart 100 from the point 2 near the charging station to a point 3 for charging the electric vehicle.

To return and self-charge the cart 100, the user should substantially linearly move the cart 100 from the point 3 for charging the electric vehicle to the point 2 near the charging station, change the posture of the cart 100, and substantially linearly move the cart 100 to the charging terminal point 1 such that the cart 100 is docked on the charging terminal 210.

In this case, although the cart 100 of the inventive concept is supported and driven through electric motion to reduce the labor force of the user, the cart 100 is partially or totally moved through autonomous driving depending on a user request, thereby improving the user convenience. Meanwhile, the autonomous driving of the cart 100 of the inventive concept may be performed, as the ECU 190 controls the motor 160 and the brake 160-1 based on the relevant information.

Further, although the charging device 113 of the inventive concept has the form that a docking connector is provided at an end portion of a cable as illustrated in FIG. 1, the inventive concept is not limited thereto. For example, the charging device 113 may have the form that the docking connector is provided at an end portion of the robot arm.

In this case, the charging device 113 of the inventive concept may be automatically docked on the charging member of the electric vehicle at the point 3 for charging the electric vehicle through docking driving when charging, and may be automatically undocked from the charging member of the electric vehicle at the point 3 for charging the electric vehicle through undocking driving when the charging is completed. In other words, the user needs not to bother about personally docking the charging device 113 of the inventive concept on the charging member of the electric vehicle.

Meanwhile, the docking driving and the undocking driving may be performed by tracking the charging member of the electric vehicle using various sensors and driving a robot arm based on the tacking.

The following description of the cart 100 of the inventive concept will be made regarding "first autonomous driving". The cart 100 of the inventive concept may move from the point 2 near the charging station to the charging terminal point 1 through autonomous driving such that the docking terminal 114 is docked on the charging terminal 210 of the charging station 200 when performing the first autonomous driving.

In other words, when performing the first autonomous driving, the user may move the cart 100 from the charging terminal point 1 to the point 3 for charging the electric vehicle through the point 2 near the charging station, through manual driving, which is supported through the electric motion, to charge the electric vehicle.

Alternatively, when performing the first autonomous driving, to return and self-charge the cart 100, the cart 100 may be docked on the charging terminal 210 by performing autonomous driving from the point 2 near the charging station to the charging terminal point 1, by merely changing the posture of the cart 100 by the user after moving the cart 100 from the point 3 for the charging the electric vehicle to the point 2 near the charging station through the manual driving which is supported through the electric motion.

In this case, as described above, the cart 100 may be docked on the charging terminal 210 by performing autonomous driving substantially linearly from the point 2 near the charging station to the charging terminal point 1.

Meanwhile, when performing the first autonomous driving, since the cart 100 performs autonomous driving by merely linearly simple driving, the cart 100 needs not to exactly track the position of the charging terminal point 1. However, as a result, the docking terminal 114 of the cart 100 may be separated from the charging terminal 210 of the charging station 200. To prevent this, a guide part, which is provided in the form of a groove, corresponding to a guide part which is provided in the form of a protrusion of the charging terminal 210 of the charging station 200 may be formed in the docking terminal 114 of the cart 100.

In this case, the guide part, which is provided in the form of the groove, of the docking terminal 114 of the cart 100, may have a tapered shape that the sectional area of the guide part is widened in a docking direction with the charging terminal 210. Accordingly, even if the cart 100 significantly deviates from the docking path in an initial docking stage, since the guide part, which is provided in the form of the groove, of the docking terminal 114 of the cart 100 receives a tapered portion, which has a narrower sectional area, of the guide part, which is provided in the form of the protrusion, of the charging terminal 210 of the charging station 200 through a tapered portion having a wider sectional area, the docking terminal 114 of the cart 100 is guided along a correct path to be docked on the charging terminal 210 of the charging station 200.

To expand the above effect, a rail may be placed in at least a portion of a path from the point 2 near the charging station to the charging terminal point 1.

Further, the cart 100 of the inventive concept may further include a position senor (not illustrated). The position sensor may generate position information by sensing the position of the charging terminal point 1. Accordingly, the cart 100 of the inventive concept may change the posture thereof toward the charging terminal point 1 based on the position information of the charging terminal point 1 such that the docking terminal 114 is aligned with the charging terminal 210, at the point 2 near the charging station and may substantially linearly perform autonomous driving to dock on the charging terminal 210.

To this end, a feature point (not illustrated) sensed by the position sensor may be formed at the charging terminal 210. For example, the feature point may be a smart code, but the inventive concept is not limited thereto. In addition, the position sensor may include various types of sensors. For example, a Lidar sensor, an ultrasonic sensor, a 3D camera module, an RGBD camera module, and a Kinect may be used as the position sensor, but the inventive concept is not limited thereto.

The following description of the cart 100 of the inventive concept will be made regarding "second autonomous driving". The cart 100 of the inventive concept moves from the point 3 for the charging the electric vehicle to the charging terminal point 1 through the autonomous driving such that the docking terminal 114 may be docked on the charging terminal 210 of the charging station 200, when performing the second autonomous driving.

In other words, when performing the second autonomous driving, the user may move the cart 100 from the charging terminal point 1 to the point 3 for charging the electric vehicle through the point 2 near the charging station, through manual driving, which is supported through the electric motion, to charge the electric vehicle, which is similar to the first autonomous driving.

However, the entire procedures of returning to the charging station 200 after completing the charging may be performed through autonomous driving based on the second autonomous driving of the inventive concept, which is different from the first autonomous driving.

To this end, a parking lot to be used by the cart 100 of the inventive concept may be mapped, and the point 3 for charging the electric vehicle and the charging terminal point 1 may be specified in the mapped parking lot.

The cart 100 may move through autonomous driving from the point 3 for charging the electric vehicle to the charging terminal point 1, based on coordinates of the point 3 for charging the electric vehicle and coordinates of the charging terminal point 1 in the mapped parking lot, such that the cart 100 is docked on the charging terminal 210.

Meanwhile, the cart 100 of the inventive concept may further include a position sensor (not illustrated), which is similar to that of the first autonomous driving, and the point 3 for charging the electric vehicle and the point 2 near the charging station may be specified in the mapped parking lot.

In this case, the cart 100 may i) move through autonomous driving from the point 3 for charging the electric vehicle to the point 2 near the charging station, based on coordinates of the point 3 for charging the electric vehicle and coordinates of the point 2 near the charging station in the mapped parking lot, and ii) be docked on the charging terminal 210 by linearly performing autonomous driving from the point 2 near the charging station to the charging terminal point 1 after changing the posture thereof based on the position information of the charging terminal point 1.

In other words, when performing the second autonomous driving, the cart 100 may move along some path based on coordinates specified through the mapping of the parking lot and may perform autonomous driving along a remaining some path based on the position information of the charging terminal point 1 to dock on the charging terminal 210, which is similar to the first autonomous driving.

Meanwhile, alternatively, the cart 100 of the inventive concept may perform autonomous driving using an encoder value of the motor 160. In this case, the motor 160 may generate an encoder value of a path that the cart 100 moves from the charging terminal point 1 to the point 3 for charging the electric vehicle. In other words, the motor 160 may generate the encoder value when the user may move the cart 100 from the charging terminal point 1 to the point 3 for charging the electric vehicle via the point 2 near the charging station, through manual driving, which is supported through the electric motion, to charge the electric vehicle.

After the charging of the electric vehicle is completed, the cart 100 may be docked on the charging terminal 210 by performing autonomous driving along a returning path, which is processed by reversely calculating the encoder values recorded while moving in time-series, from the point 3 for charging the electric vehicle to the charging terminal point 1.

In other words, the cart 100 of the inventive concept may return to the charging station 200 by performing a control operation reversely to the time-series sequence of the manual motor driving after recording the encoder values of the motor 160 through the manual driving (which is replaced with autonomous driving in third autonomous driving to be described below) of the user.

The following description of the cart 100 of the inventive concept will be made regarding "third autonomous driving". The cart 100 of the inventive concept may be realized as performing autonomous driving in all a moving procedure for charging the electric vehicle and a moving procedure for returning to the charging station 200, when performing the third autonomous driving.

In other words, when performing the third autonomous driving, the cart 100 moves through the autonomous driving from the charging terminal point 1 to the point 3 for charging the electric vehicle and moves through the autonomous driving from the point 3 for charging the electric vehicle to the charging terminal point 1 to be docked on the charging terminal after completing the charging of the electric vehicle.

Meanwhile, the returning procedure in the second autonomous driving is analogically applied to a moving procedure for returning to the charging station 200 in the third autonomous driving.

The following description of the third autonomous driving will be made in that the procedure for the cart 100 of the inventive concept to move to charge the electric vehicle is performed through the autonomous driving, and the description of a part to which the returning procedure to the second autonomous driving mode is analogically applied will be omitted.

To perform the moving procedure for charging the electric vehicle through autonomous driving when performing the third autonomous driving, the point 3 for charging the electric vehicle and the charging terminal point 1 may be specified in the mapped parking lot, and the cart 100 may move (i) from the charging terminal point 1 to the point 3 for charging the electric vehicle through the autonomous driving based on the coordinates of the point 3 for charging the electric vehicle and the coordinates of the charging terminal point 1 in the mapped parking lot.

The following description will be made in that the driving or the stop of the cart 100 of the inventive concept may be controlled in response to the central control signal (central control) of the central control system (control tower) 10 and a manager control signal (manager control) of the manager 20. As described above, according to the cart 100 of the inventive concept, although the degree of freedom of the user and the convenience (labor force reduced) of the user are ensured through the user control (the control in response to the user driving signal and the user stop signal) and the autonomous driving, the central control system 10 and/or the manager 20 may be always involved to cope with the situation having the higher accident possibility and the situation that the accident occurs (safety ensured).

The cart 100 of the inventive concept may be under the control of the central control system 10. In this case, the central control system 10 may be involved in the emergency situation. Alternatively, the cart 100 of the inventive concept may be provided in a stand-alone type that the central control system 10 is omitted. In this case, the manager 20 may be involved in the emergency situation. Further, according to the cart 100 of the inventive concept, both the central control system 10 and the manager 20 may be involved in the emergency situation.

Meanwhile, according to the cart 100 of the inventive concept, the central control and the manager control are applied in preference to the user control and the autonomous driving. Accordingly, once at least one of the central control and the manager control is started, the user may not control the cart 100 and the autonomous driving may be turned off.

The central control by the central control system 101 may be realized through a wireless communication scheme. The central control may be performed, as the ECU 190 wirelessly receives the central control signal from the central control system 10 to control the motor 160 and the brake 160-1. In this case, the central control signal may be a concept including a central control driving signal and a central control stop signal. However, the central control scheme of the inventive concept is not limited to the above scheme.

The manager control by the manager 20 may be realized through a wired/wireless communication scheme. The manager control may be performed, as the ECU 190 receives the manager control signal from the manager 20 to control the motor 160 and the brake 160-1. In this case, the manager control signal may be a concept including a manager control driving signal and a manager control stop signal. Meanwhile, the manager 20 may include an additional terminal to transmit the manager control signal to the ECU 190 of the cart 100. However, the manager control scheme of the inventive concept is not limited to the above scheme.

For example, the manager 20 may directly input the manager control signal to the ECU 190 by controlling the operating unit 130 of the cart 100 like a user. In this case, the cart 100 may include an identifying unit (not illustrated) to identify the user and the manager 20. Accordingly, in an emergency situation, the manager 20 receives the operating unit 130 from the user, is authenticated through the identifying unit, and controls the driving of the cart 100 by controlling the operating unit 130.

As described above, the cart 100 of the inventive concept is driven by at least one of the user control and the autonomous driving. The cart 100 to charge the electric vehicle parked in the parking lot may be controlled in driving and stop by at least one of the central control and the manager control in preference to the user control and the autonomous driving.

Meanwhile, the central control and the manager control may be started through the user request or through the forcible involving of the central control system 10 and the manager 20. Meanwhile, the cart 100 of the inventive concept may include a user calling unit (not illustrated), and the user may request the central control and/or the manager control by calling the central control system 10 and/or the manager 20 if necessary.

For example, when the obstacle stop signal is generated during the driving through the user control or the autonomous driving, the central control system 10 and/or the manager 20 may receive the obstacle stop signal to generate the central control signal and/or the manager signal, thereby controlling the cart 100.

Meanwhile, the central control system 10 and/or the manager 20 may selectively generate the central control signal and/or the manager control signal. When there is no possibility of the accident even if the cart 100 is controlled through the user control or the autonomous driving, the central control signal and/or the manager control signal may not be generated (whether the central control is involved is determined depending on the selection of the central control system and the manager).

Meanwhile, since the central control system 10 and/or the manager 20 cannot instantly react with an accident, when the obstacle stop signal is generated, the cart 100 of the inventive concept may be automatically stopped or controlled in moving direction as soon as the obstacle stop signal is generated, in preference to the central control signal and/or the manage control signal, and then the driving and the stop of the cart 100 may be controlled in response to the central control signal and/or the manager control signal.

In addition, when the impact stop signal is generated during the driving through the user control or the autonomous driving, the central control system 10 and/or the manager 20 receives the impact stop signal to generate the central control signal and/or the manager control signal, thereby controlling the cart 100.

Meanwhile, as described above, the central control system 10 and/or the manager 20 may selectively generate the central control signal and/or the manager control signal, automatic stop or the control in moving direction may be performed as soon as the impact stop signal is generated, in preference to the central control signal and/or the manage control signal, and then the driving and the stop may be controlled in response to the central control signal and/or the manager control signal.

Further, the cart 100 of the inventive concept includes an alert part (not illustrated), so an alert may be provided to the user when at least one of the central control and the manager control is started. Accordingly, the user may currently recognize the situation that the central control and/or the manage control is started, and may be separated from the cart 100 by a specific distance to prevent the central control and/or the manager control from being interrupted.

The inventive concept provides the cart to perform automatic stopping in preference to the user driving signal when the obstacle is present or the impact is applied, thereby preventing the damage from the impact accident even if the user does not recognize the obstacle.

The inventive concept provides the cart to provide various stimuli (haptic stimulation or visible stimulation by the light source) to the user when the obstacle is present or the impact is applied, thereby allowing the user to intuitively recognize the position and the direction of the obstacle and the position and the direction of the impact.

Further, the inventive concept provides the cart to allow the user to recognize the dangerous situation through the rebound of the cart, when the user continuously attempts to drive in spite of the dangerous situation.

The inventive concept provides the electric cart for charging the electric vehicle, capable of reducing the labor force of the user by driving based on the driving control of the user and the autonomous driving, and allowing the central control system (control tower) and the manger to be involved in the emergency situation (user calling or obstacle sensing) such that central control or manger control is preferentially applied, thereby preventing the accident or reducing the damage from the accident.

In addition, according to the electric cart for charging the electric vehicle of the inventive concept, the coordinates of the point for charging the electric vehicle may be specified in the mapped parking lot, and autonomous driving may be performed from the charging terminal point of the charging station to the point for charging the electric vehicle.

Therefore, the user may skip the work to move the cart to the point for charging the electric vehicle in charging and the work to move the cart to the charging station when finishing the charging and to dock the cart on the charging terminal, thereby reducing the labor force of the user required for the works.

The effects of the inventive concept are not limited to the above, but other effects, which are not mentioned, will be apparently understood to those skilled in the art.

Although the embodiment of the inventive concept have been described with reference to accompanying drawings, those skilled in the art should understand that various modifications are possible without departing from the technical scope of the inventive concept or without changing the technical sprite or the subject matter of the inventive concept. Therefore, those skilled in the art should understand that the technical embodiments are provided for the illustrative purpose in all aspects and the inventive concept is not limited thereto.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A charging system comprising:
a charging station provided on a column between two vehicle parking zones, and configured to supply charging power, wherein the charging station comprises a charging terminal having a tapered end;
a cart comprising:
a body;
an operating unit disposed in the body;
an obstacle sensor configured to generate an obstacle stop signal by sensing an obstacle;
a wheel provided configured to move the body;
a motor configured to control a driving of the wheel;
an electronic control unit configured to control the motor;
a docking terminal configured to dock with the charging terminal of the charging station from a back surface of the body,
wherein the docking terminal comprises a groove having a shape corresponding to a shape of the tapered end of the charging terminal of the charging station, and
wherein an opening of the groove is positioned on a center of a lower end of a rear surface of the body, the tapered end of the charging terminal of the charging station is configured to be inserted into the groove from the opening of the groove, and a width of the groove is tapered toward a center of a bottom surface of the body;
a charging device that is a cable and is positioned on a front surface of the body,
wherein the operating unit is configured to:
generate a user driving signal and a user stop signal by sensing at least one of an intensity and a direction of external force applied through contact with a user body,
wherein the electronic control unit is configured to:
drive and stop the cart by driving the motor in response to the user driving signal and the user stop signal,
perform at least one of stopping the cart and controlling a moving direction of the cart by controlling the motor in preference to the user driving signal, when the obstacle stop signal is generated during driving of the cart, and
control the motor to move the cart such that rebound stimulation is provided to the user, when the user driving signal is generated within a specific time after the obstacle stop signal is generated during the driving of the cart,
wherein the electronic control unit is further configured to provide the rebound stimulation to the user through movement of the cart by controlling the motor when the user driving signal is generated in a state that the obstacle stop signal is maintained after the obstacle stop signal is generated during the driving of the cart, and
wherein the rebound stimulation is moving the cart to a specific distance in a direction opposite to a direction of the driving of the cart.

2. The charging system of claim 1, wherein the cart further includes:
a brake configured to stop the driving of the wheel, and
wherein the electronic control unit is further configured to perform at least one of stopping the cart and controlling the moving direction of the cart by controlling at least one of the motor and the brake in preference to the user driving signal, when the obstacle stop signal is generated during the driving of the cart.

3. The charging system of claim 1, wherein the electronic control unit is further configured to control the motor to control the driving of the wheel in a reverse direction to stop the cart.

4. The charging system of claim 1, wherein the cart further includes:
a haptic unit disposed in the operating unit, and
wherein the electronic control unit is further configured to provide haptic stimulation to a user through the haptic unit, when the obstacle stop signal is generated during the driving of the cart.

5. The charging system of claim 4, wherein the electronic control unit is further configured to determine at least one of an intensity of the haptic stimulation and a position in which the haptic stimulation is provided, depending on information on the obstacle.

6. The charging system of claim 4, wherein the electronic control unit is further configured to determine at least one of an intensity of the haptic stimulation and a position in which the haptic stimulation is provided, depending on at least one of the intensity and the direction of the external force applied by an impact.

7. The charging system of claim 1, wherein the cart further includes:
a light source unit configured to emit light, and
wherein the electronic control unit is further configured to provide light stimulation to a user through the light source unit, when the obstacle stop signal is generated during the driving of the cart.

8. The charging system of claim 7, wherein the electronic control unit is further configured to determine at least one of an intensity of the light stimulation, a position at which light is emitted, a range that the light is emitted, a wavelength band of the light, and a blinking pattern of the light depending on information on the obstacle.

9. The charging system of claim 7, wherein the electronic control unit is further configured to determine at least one of an intensity of the light stimulation, a position at which light is emitted, a range that the light is emitted, a wavelength band of the light, and a blinking pattern of the light depending on at least one of the intensity and the direction of the external force applied by an impact.

10. The charging system of claim 1, wherein the cart is controlled to drive through at least one of user control and autonomous driving and to drive and stop through at least one of central control and manager control in preference to the user control and the autonomous driving.

11. The charging system of claim 10, wherein the cart is controlled to drive and stop through the at least one of the central control and the manager control after the cart stops or a moving direction of the cart is controlled, when an obstacle stop signal is generated during the driving through the user control or the autonomous driving.

12. The charging system of claim 10, wherein a user is alerted, when the at least one of the central control and the manager control is started.

13. The charging system of claim 10,
wherein the cart is configured to dock on the charging terminal by linearly performing the autonomous driving from a point near the charging station to a charging terminal point.

14. The charging system of claim 13, wherein the cart further includes:
a position sensor configured to generate position information by sensing a position of the charging terminal point, and wherein the cart is configured to dock on the charging terminal by performing linearly the autonomous driving to the charging terminal point after changing a posture based on the position information of the charging terminal point at the point near the charging station.

15. The charging system of claim 13, wherein the cart is configured to dock on the charging terminal by moving through the autonomous driving from a point for charging an electric vehicle to the charging terminal point.

16. The charging system of claim 13, wherein the cart is configured to move from the charging terminal point to a point for charging an electric vehicle through the autonomous driving, and move from the point for charging the electric vehicle to the charging terminal point through the autonomous driving after the charging of the electric vehicle is completed.

17. The charging system of claim 16, wherein the cart is configured to dock on a charging member of the electric vehicle at the point for charging the electric vehicle through docking driving, and undock from the charging member of the electric vehicle at the point for charging the electric vehicle through undocking driving of the charging device.

18. The charging system of claim 16, wherein the point for charging the electric vehicle and the charging terminal point are specified in a mapped parking lot,
- wherein the motor generates an encoder value of a moving path that the cart moves from the charging terminal point to the point for charging the electronic vehicle, and
- wherein the cart moves through the autonomous driving from the charging terminal point to the point for charging the electric vehicle, based on coordinates of the point for charging the electric vehicle and coordinates of the charging terminal point in the mapped parking lot and is docked on the charging terminal by performing the autonomous driving along a returning path processed by reversely calculating an encoder value from the point for charging the electric vehicle to the charging terminal point in time-series.

* * * * *